US005987178A

United States Patent [19]

Anesko et al.

[11] Patent Number: 5,987,178
[45] Date of Patent: Nov. 16, 1999

[54] APPARATUS AND METHOD FOR A PROGRAMMABLE VIDEO MOTION ESTIMATOR

[75] Inventors: Alexander Anesko, Red Bank; Horng-Dar Lin, Holmdel; Gordana Pavlovic, Tinton Falls; Brian John Petryna, Lebanon, all of N.J.

[73] Assignee: Lucent Technologies, Inc., Murray Hill, N.J.

[21] Appl. No.: 08/603,843

[22] Filed: Feb. 22, 1996

[51] Int. Cl.$^6$ .................................. G06K 9/36; G06K 9/46
[52] U.S. Cl. .......................... 382/236; 348/416; 348/699; 382/304
[58] Field of Search ..................................... 382/205, 232, 382/234, 236, 304, 107; 358/261.3, 261.4, 433; 348/402, 407, 413, 416, 431, 699, 451, 452; 345/202, 474, 516, 517, 518; 386/111

[56] References Cited

U.S. PATENT DOCUMENTS

| | | | |
|---|---|---|---|
| 4,630,308 | 12/1986 | Hongo | 382/205 |
| 5,586,202 | 12/1996 | Ohki et al. | 382/304 |
| 5,594,813 | 1/1997 | Fandrianto et al. | 382/236 |
| 5,630,033 | 5/1997 | Purcell et al. | 348/699 |
| 5,724,608 | 3/1998 | Tohara | 395/827 |

*Primary Examiner*—Amelia Au
*Assistant Examiner*—Timothy M. Johnson

[57] ABSTRACT

A programmable motion estimator having a memory and processing element array that implement a dual addressing scheme and a block rotating scheme that work together to perform block difference calculations required in video encoder subsystems to provide motion estimation with less processing power without comprising video quality.

21 Claims, 9 Drawing Sheets

APPARATUS AND METHOD FOR A PROGRAMMABLE VIDEO MOTION ESTIMATOR

FIELD OF THE INVENTION

The present invention relates to video imaging systems, and more particularly to a method and apparatus for programmable motion estimation of video image sequences.

BACKGROUND OF THE INVENTION

Video coders/decoders are widely used to provide motion video in many present day applications including video conferencing, video mail, video telephony and image database browsing. In order to provide high quality video in such applications, a video system must have high data storage capability.

To illustrate, one frame of a digitized NTSC (National Television Standard Committee) quality video comprising 720×480 pixels requires approximately one half megabyte of digital data to represent the image. As a result, in an NTSC system that operates at 30 frames per second, the video will generate over 15 megabytes of data per second. Thus, depending on the video system, video imaging can create significant storage and rate problems.

It has been determined, however, that video can be compressed in some form to reduce these data storage and data rate demands, and thus increase the overall throughput of the system. One method of video data compression involves estimating the motion between successive frames of video. Generally, it has been found that when there is little or no motion of objects within the scene, from one frame to the next, there is a great amount of redundancy between successive frames of the video sequence. As a result, it is unnecessary to send the entire data block for each frame to reliably recreate the image at the receiver (decoder). Rather, the transmitter (encoder) need only send information on those changes or motion of objects between successive frames. That is, it has been determined that the throughput and efficiency of the video encoder could be greatly enhanced by identifying or estimating the motion of objects between successive frames. Consequently, those skilled in the art have found that motion estimation plays an important role in achieving high data compression, and thus high efficiency video encoders.

Motion estimation is a tool or method of predicting a present frame using a target frame to exploit the redundancy between frames, and thus reduce the amount of information transmitted to the receiver. The target frame is a frame other than the present frame. For example, the target frame can be the frame immediately preceding the present frame in time. A motion estimator predicts the motion of objects between frames of video, usually by computing displacement vectors, which is accomplished by computing the differences between blocks of data in successive frames (i.e. block difference calculations). The calculation or extraction of this motion information is computationally intensive, thus placing a burden on the hardware designed to perform such a task. In fact, motion estimation is the most computationally demanding task in encoding video in the H.261, H.262 and H.263 standards.

Presently, many video systems implement a block-based method of motion estimation. In such block-based systems, an image is divided into blocks of pixels. Each pixel defines both a coordinate (or displacement vector) within the frame and an integral value that represents luminary content at that coordinate. To estimate motion, the integral values of each block of pixels in a present frame (hereinafter called "reference block") is compared against the integral values of similarly-sized blocks of pixels in a region of a target frame (hereinafter called "search area"). The search area data blocks that most closely match the reference block provide the best estimate of the change in position of objects in the frame. Thus, if the reference block and the closest matching search area block have the same coordinates, the encoder reports no motion for that block of data. Conversely, if the reference block and the closest matching search area block have significantly differing coordinates, the system assumes motion occurred between frames.

A match may be determined using a number of procedures. For example, a match may be found by taking some metric representing a comparison between pixels, and then summing the metrics, pixel by pixel, over the entire block. Since the metric is typically one of absolute difference, mean-squared difference, etc., the summation of metrics is called a block difference calculation. Moreover, since each pixel within a frame also defines a coordinate or displacement vector, each block difference has a displacement vector associated with it. Thus, the displacement vector associated with the best match represents the direction of motion of an object in the present frame with respect to the target frame. As a result, the primary function of the block based motion estimator is to find a block of pixels in the target frame that most closely matches the block of pixels in the present frame to determine if and how much motion has occurred between these frames, and thus enable a host microprocessor (i.e. of a video codec) to minimize the amount of information that must be sent from frame to frame to recreate the images at the receiver.

Depending on the desired quality of the video encoder, the design of the architecture of such block based motion estimators can become fairly complex. In addition, the algorithm required to direct the estimator architecture to perform the computations necessary to find the block difference for each location in a search area can also become quite complex. As a result, over the years many block-based motion estimation algorithms have been proposed, each algorithm presenting different levels of video quality at the cost of different levels of architecture and algorithm complexity.

One such algorithm is the full search algorithm. In full search motion estimation, the estimator systematically searches through every vector point within the search area (target frame) and compares each and every unique reference-block-sized region within the search area with the reference block to find the best match. Since most pixels are shared between successive reference-block-sized regions within a search area, search areas are typically traversed one pixel offset per block difference. As a result, the block difference computation is a key operation in motion estimation (See FIG. 1). FIG. 1 shows a reference block 80 traversing a target or search area 81, pixel by pixel, wherein displacement vector 82 indicates the present position of reference block 82.

Although many different motion estimation algorithms have been developed over the years, they all involve block-difference computation similar to the computation of an M×N block by the distortions function D(x,y), defined as:

$$D(x, y) = \frac{1}{MN} \sum_{m=0}^{M-1} \sum_{n=0}^{N-1} |s(m+x, n+y) - r(m,n)|$$

where s(i,j) is the search area pixel, r(i,j) is the reference macroblock pixel and D(x,y) is the block displacement in the search. The present day motion estimators differ mainly in the size of the M×N data blocks and the size of the search area (indicated by the range of x and y) that is used to calculate the block differences. In any event, however, the data in all present day motion estimators is stored in memory.

To illustrate the manner in which present day estimators compute block differences, an M=N=8 block is searched through a search area having an index range between (0,0) and (21,21). That is, $21 \geq x \geq 0$ and $21 \geq y \geq 0$. Typically, the computation is done through an array having a set of processing elements. The processing elements hold a specific r(m,n) content, compute the absolute difference |s(m+x,n+y)−r(m,n)|, and add the absolute difference to a partially accumulated sum. FIG. 2 illustrates the block difference computation for the given search area 85.

As shown, the reference pels r(m,n) are stored in the array. The reference pels represent the pixel data of a block of pixels in the present or reference frame. The memory then pumps search area pels into the array and computes the difference between the search area pixel and the reference pixel, the difference being called a partial score. The array then sums up the partial scores of the pixel by pixel difference computations for the entire reference block, and generates block differences D(x,y) therefore. This is often done in pel stripes. For example, the computation is computed for the first stripe D(0,0), D(0,1), D(0,2), ..., D(0,21), and then the second stripe D(1,0), D(1,1), D(1,2), ..., D(1,21), and finally to the 22 stripe D(21,0), D(21,1), D(21,2), ..., D(21,21).

There are two types of conventional memory-array architecture in performing such block difference computation. The first type is a serial 1D array as illustrated in FIG. 3. Here, the memory 87 feeds the 1D array 88 in 1-pel wide stripes while the array 88 uses side registers 89 to align the partial sums computed by the processing elements. This approach to computing block differences was implemented in many video encoder subsystems and motion estimators.

Another approach to calculating block differences is to use parallel memory and parallel 2D array structure as illustrated in FIG. 4. Note that in FIG. 4 the data needs to be realigned before the array 90 computes a new stripe of D(x,y). For example, when computing the first stripe D(0,0), D(0,1), ... D(0,21), a processing element 91 with r(0,0) computes the absolute difference between r(0,0) and s(0,i) to be accumulated, where $0 \leq x \leq 21$. Therefore, the processing element should receive a pel stream of s(0,i) from the memory.

In general, for the first stripe, processing elements 91 on column 0 should receive pel stream s(0,i), processing elements 91 on column 1 should receive pel stream s(1,i), ..., and processing elements 91 on column 7 should receive pel stream s(7,i). For the second stripe D(1,0), D(1,1), ..., D(1,21), the processing element with r(0,0) computes the absolute difference between r(0,0) and s(1,i). Thus, processing elements 91 on column 0 receives a pel stream s(1,i) from the memory. Similarly, column 1 receives pel stream s(2,i), column 2 receives pel stream s(3,i) etc.

Thus, in this approach to calculating block differences, the pel stream alignment is shifted and the data is aligned in a pattern as shown in FIG. 5. As shown, for the first stripe, D(0,0), D(0,1), ... D(0,21), the reference block is matched against the pel stripe 93 delineated with solid lines within the search region 85 shown in FIG. 2. For the second stripe D(1,0)(1,1), ..., D(1,21), reference block is moved one pel to the right to match against the second pel stripe 94 delineated with dash lines in FIG. 2. This one pel shift per stripe is repeated until the last search stripe is shifted in.

In order to support the data alignment pattern of this approach, however, the memory must provide addition bandwidth to retrieve all the pels. Moreover, the windowing/shifting block must properly select the appropriate pels and align them in the appropriate array columns. As shown in FIG. 4, a typical architecture that accommodates this approach utilizes a 16-pel wide memory to extract data from an 8-pel window.

Although there are motion estimators that implement other approaches to manipulating the reference data and the search area data, such as reloading the reference pels, they all require additional memory access bandwidth. Consequently, present day motion estimators implement full search algorithms and architecture that require very complex methods of aligning the data in the array for making the block difference calculation. As a result, present day video encoding subsystems have motion estimators that implement search algorithms and complex architecture that require much processing power.

SUMMARY OF THE INVENTION

Accordingly, the present invention is directed to video encoding subsystems and motion estimators that implement a method of computing block differences in generating motion vectors such that the required processing power and architecture complexity is substantially minimized. To attain this, the programmable motion estimator utilizes a dual-addressing memory and a block-rotating PE array to make the block difference calculations without compromising video quality.

More specifically, the memory and array architecture provide flexible algorithm programmability that can be programmed as desired by a host processor through control circuitry. In addition, the memory and PE array provide a pipelining mechanism that provides the ability to rotate the reference block within the array while it is running, and simultaneously read the memory contents into the array using a dual addressing mechanism. The architecture and method eliminate the need for a barrel shifter (as used in prior art motion estimators), and substantially reduce the cycle requirements (i.e. processing power) to compute block differences. Moreover, based on the joint design of the present inventive method and architecture, the present invention provides a video encoding subsystem that minimizes the complexity of computing motion vectors without sacrificing video quality. Thus, the present invention overcomes to a large extent, the limitations associated with the prior art.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION OF VARIOUS ILLUSTRATIVE EMBODIMENTS

As discussed above, block-based motion estimation is based on searching within a given area of a target video frame to find the block of pixels that best matches the reference block of pixels in the present frame. The match, identified through block difference calculations, defines a block displacement indicating the direction and magnitude of movement of the reference block between frames.

Figure 6:
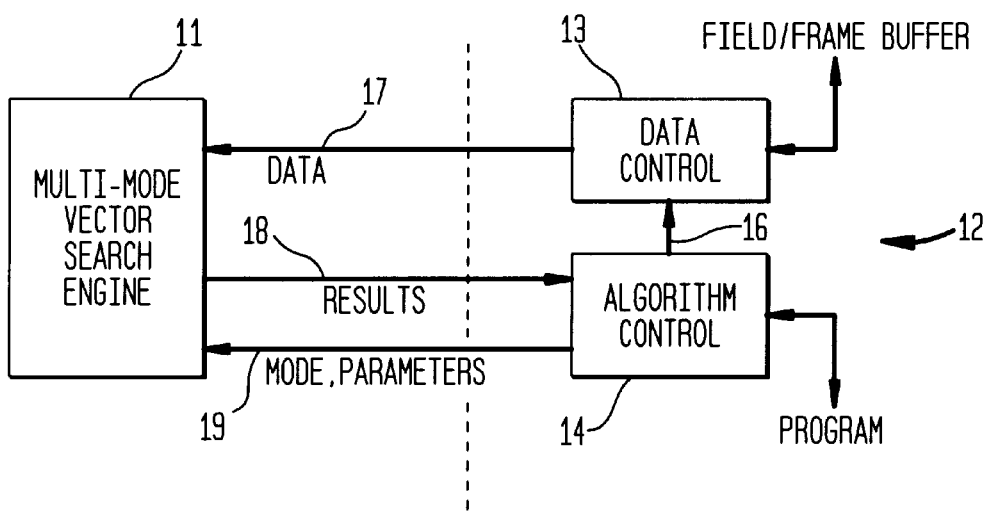
FIG. 6 shows a block diagram of one system architecture in which the motion estimator circuit of the present invention is embedded.

Referring to FIG. 6, there is shown a block diagram of one embodiment of the architecture in which the programmable motion estimator circuit of the present invention is embedded, hereinafter referred to as circuit 10. Circuit 10 is essentially composed of two functional parts: a multi-mode vector search engine or motion estimator 11; and a processing engine 12. Processing engine 12 is separated into data control hardware 13 and algorithm control hardware 14 which communicate with each other over line 16. Data control 13 sends information over data lines 17 to motion estimator 11. Algorithm control 14 is electrically connected to motion estimator 11 through control lines 18 and 19.

In operation, processing engine 12 provides control over motion estimator 11 which performs the actual block difference calculations to determine the best match between a reference block in the present frame and blocks within the search area of a target frame. The processing engine can selectively set the specific algorithm to be run by motion estimator 11 through algorithm control hardware 13. Data control hardware 14, in turn, controls the flow of pixel data to motion estimator 11 to enable the desired algorithm to direct estimator 11 to perform the number crunching necessary to determine block differences and vector (or block) displacements. From this information, the processing engine can reduce the amount of information sent to the receiver.

The separation of processing engine 12 into data control 13 and algorithm control 14 provides the ability to control circuit 10 through an industry-standard RISC core. As a result, commercial grade tools can be used to program the RISC core to perform various hierarchical motion estimator algorithms while providing the ability to reuse motion estimator 11 for other video coding tasks. In addition, motion estimator 11 can be reused for other video codec VLSI's or can be configured as a coprocessor to assist the general microprocessor to code real-time video. Thus, providing a flexible programmable motion estimator.

Figure 7:
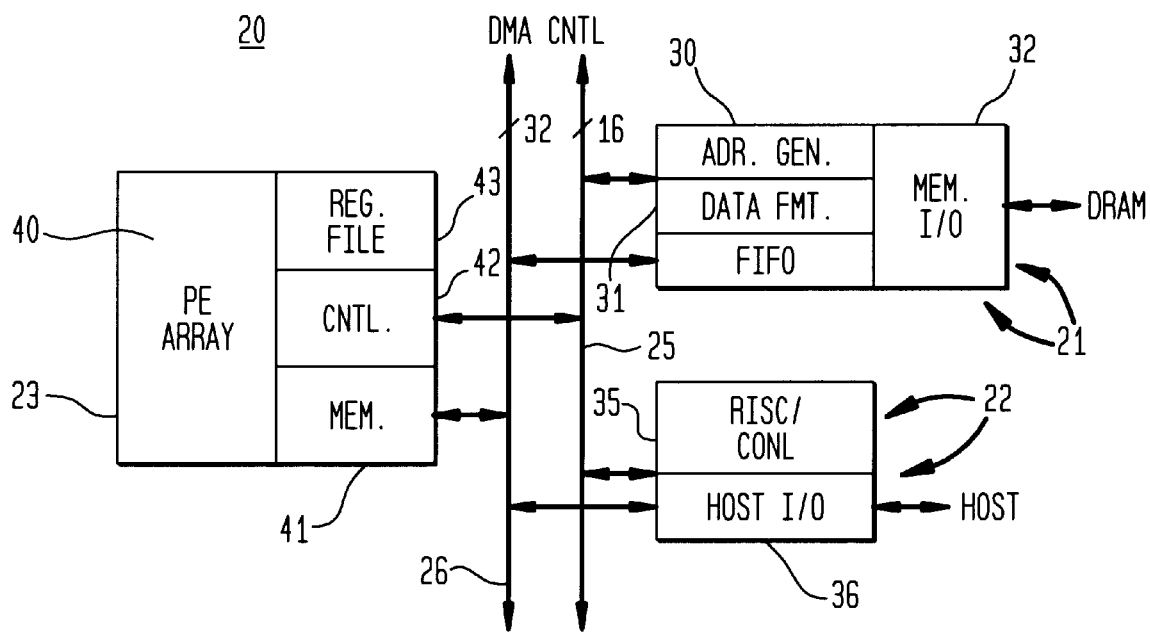
FIG. 7 shows a block diagram of another embodiment of a system architecture in which the motion estimator circuit of the present invention is embedded.

FIG. 7 shows a block diagram of an embodiment of the present invention embedded in a video codec, hereinafter referred to as circuit 20. Circuit 20 is composed of data control 21, algorithm control 22 and multi-mode motion estimator 23, which are all electrically connected through control bus 25 and DMA bus 26. Control bus 25 is 16 bits wide whereas DMA bus 26 is 32 bits wide.

Data control 21 has an address generator 30, a data formatter 31, and memory I/O interface 32 which is directly connected to the random access memory (not shown) of the video codec (not shown). Algorithm control 22 has a RISC controller 35 and a host I/O interface 36 directly connected to the host processor (not shown) of the video codec (not shown). Motion estimator 23 has a processing element array 40, memory 41, controller 42, and register file 43.

In operation, users can program RISC 35 through host I/O 36 to set up the motion search algorithm or other processing function of circuit 20. More specifically, RISC 35 translates each search step by issuing instructions to programmable data control 21 and motion estimator 23 through control bus 25. Upon receiving the instruction, data control 21 receives data from the codec random access memory, formats the data according to grid specification, performs any filtering, and initiates data transfer to memory 41 of motion estimator 23 through DMA bus 26.

RISC controller 35 dispatches instructions to the motion estimator 23, including updating the operating mode and parameters such as the reference block size and the search window range. The instructions and the parameters are recorded in register file 43 to reduce dispatch overhead. Handshaking between motion estimator 23, data control 21 and algorithm control 22 are performed through interrupts and control bus 26. Namely, RISC 35 initiates actions and polls the status of data control 21 and search engine 23 through control bus 25, whereas motion estimator 23 and data control 21 generate interrupts to get the attention of RISC 35.

In addition to the technical advances created in the flexible design of circuit 20, as described above and shown in FIGS. 6 and 7, there are additional technical advances due to the architecture of motion estimator 23 which, as described above, enables the estimator of the present invention to provide block difference calculations, and thus motion vector data, with a minimal amount of hardware. As a result, these technical advances are discussed in more detail below.

Figure 8:
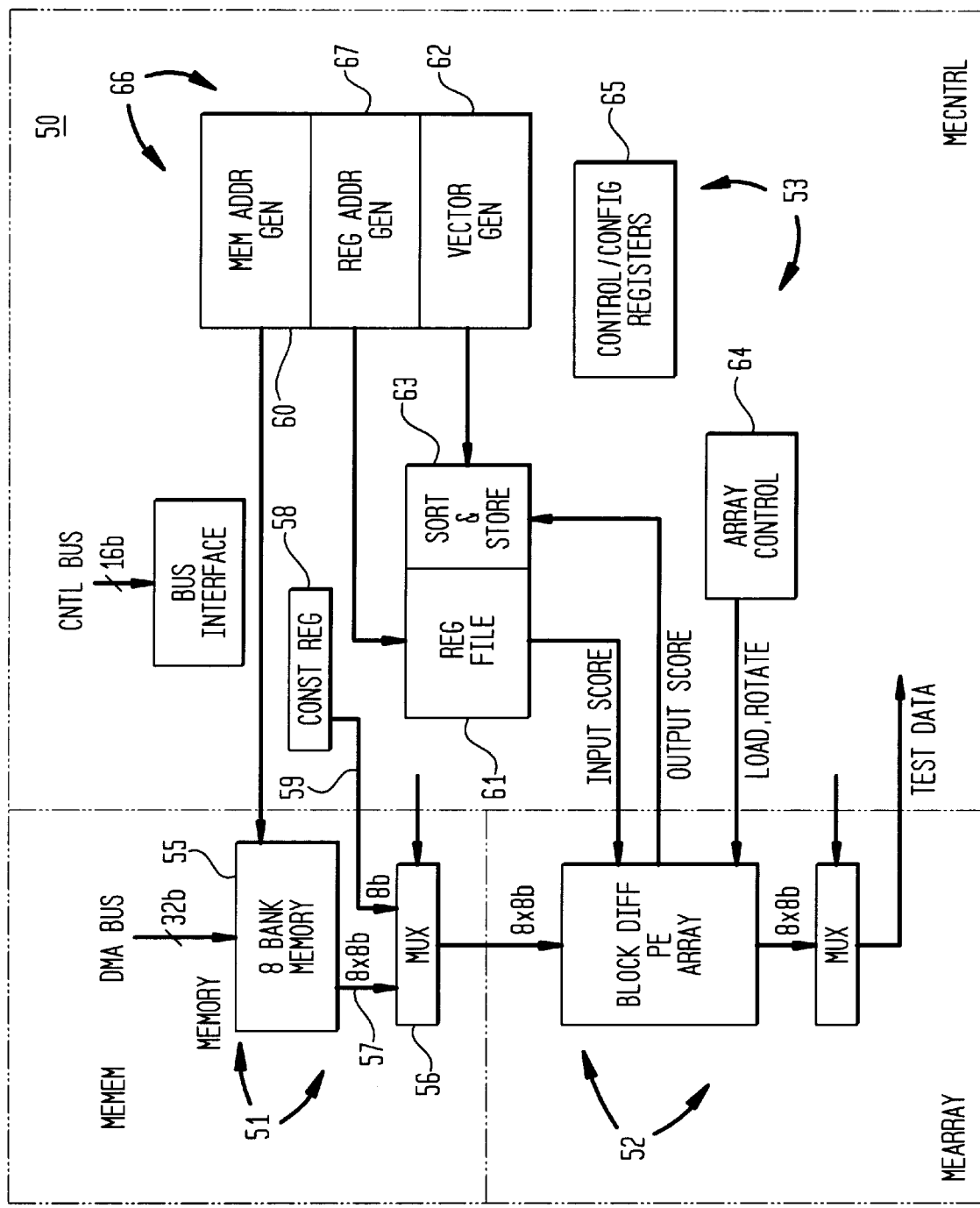
FIG. 8 shows a block diagram of one embodiment of a programmable motion estimator of the present invention.

Referring now to FIG. 8, there is shown a block diagram of one embodiment of the motion estimator of the present invention, hereinafter referred to as motion estimator 50. As shown, estimator 50 has three main subsystems: a memory subsystem 51, a processing element array (PE array) 52, and a control subsystem 53. Memory subsystem 51 has an 8 bank memory 55 electrically connected to a multiplexer 56 through an 8 bit bus 57. Multiplexer 56, in turn, is electrically connected to PE array 52. Control subsystem 53 has an array control 64, control/config registers 65 and control logic 66. Array control 64 is electrically connected to PE array 52. In addition, control 53 has control logic electrically connected to memory subsystem 51 and PE array 52. As shown, a constant register 58 electrically connected to multiplexer 56 through line 59, a memory address generator 60 electrically connected to memory 55, a register address generator 67 electrically connected to register file 61, and a vector sequence generator 62 electrically connected to sort and store registers 63.

In operation, memory 55 provides frame pixel data to PE array 52 through multiplexer 56. More specifically, memory 55 feeds a row of eight pixels to PE array 52 each cycle. These pixels may represent reference block data, in which case they are stored in the array itself, or search area data, in which case they are compared with reference block data in the array to generate block differences. At its most basic level, the architecture of PE array 52 and memory 55 define a method of computing block differences between frames using 8×8 reference blocks.

The control logic and control subsystem work together with the memory and PE array to control the storing and rotating of data in PE array 52, control the sequencing through the pixel data stored in memory 55 so that search engine 50 properly sequences through the search area to find the smallest block differences for a given reference block, and keep track of the addresses and scores of the blocks in the search area that have the lowest block differences. These addresses represent block displacements, and are ultimately used to calculate the motion vector which indicates the motion of objects between frames.

Figure 10:
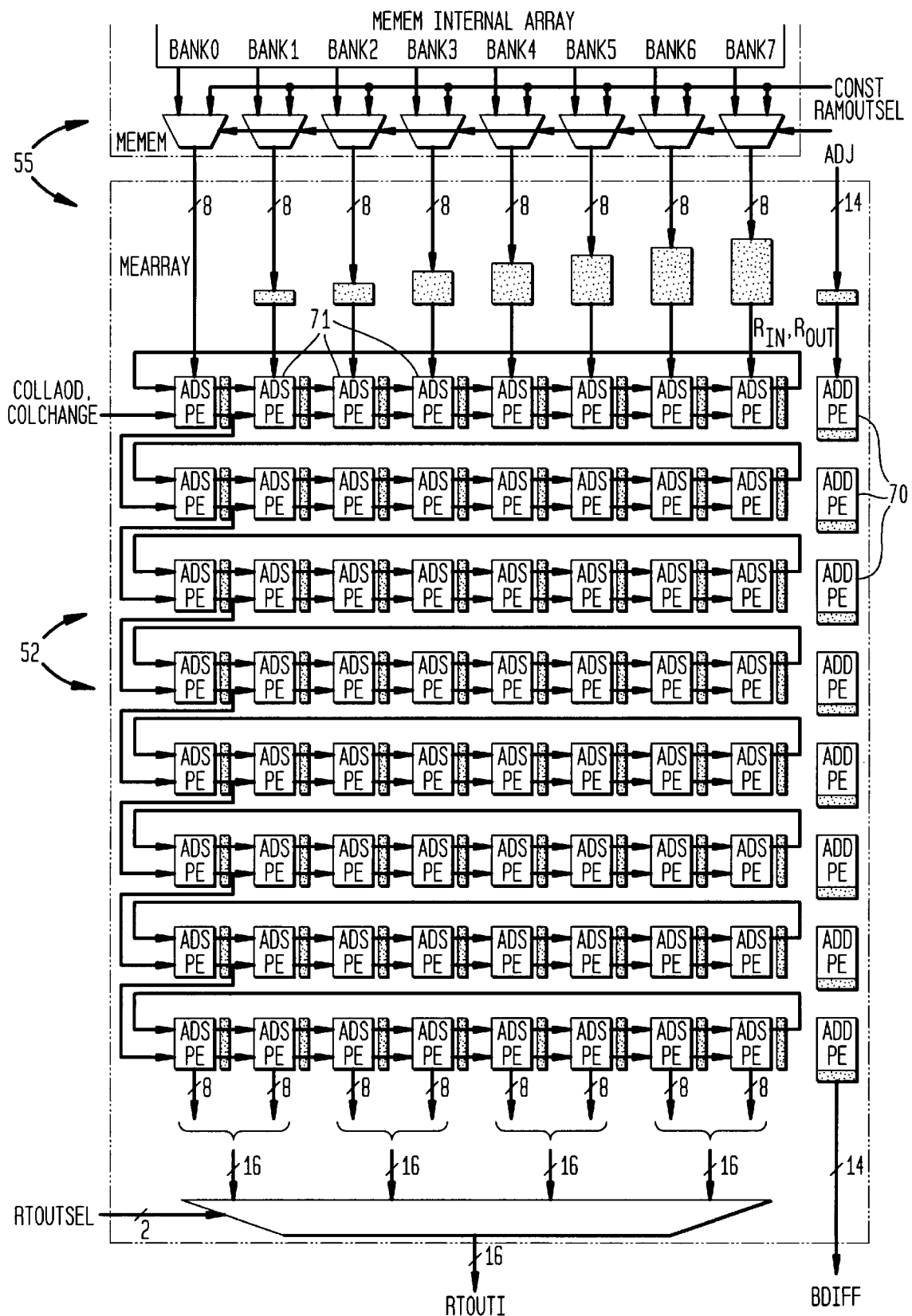
FIG. 10 shows a detailed circuit diagram of the memory and PE array of the search engine shown in FIG. 8.

In order to fully understand the significance of this architecture and the coordination of data between memory 55 and PE array 52, the actual structure or architecture of these devices must be examined. Referring now to FIG. 10, there is shown a detailed view of the architecture of memory 55 and PE array 52. As shown, PE array 52 is a hardwired block-difference engine that consists of 8 rows of 8 absolute-difference-summing processing elements (ADS-Pe) 71, where each row is electrically connected to a final summation processing element (ADD-PE) 70.

Figure 12:
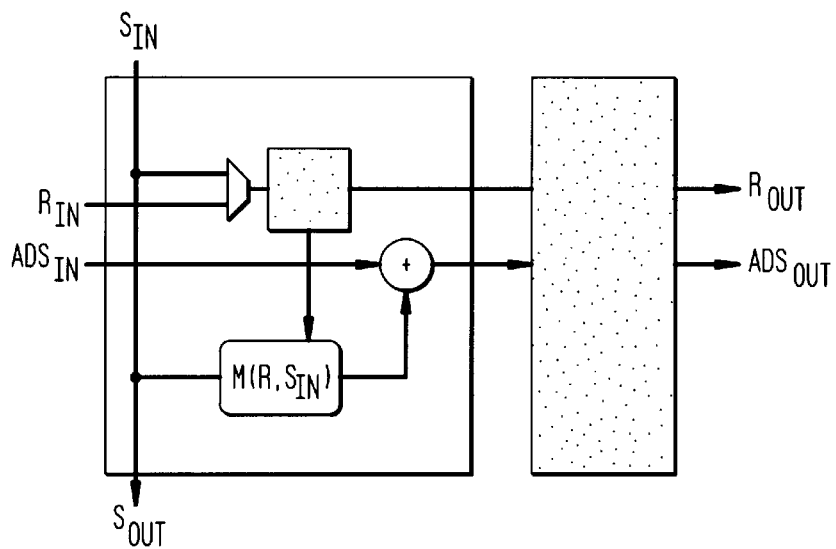
FIG. 12 shows a circuit diagram for an ADS-PE and output register of the circuit shown in FIG. 10.

The ADD-Pe 70 processing elements, in turn, constitute a column of elements, at the end of which is produced a block difference (bdiff). FIG. 12 shows an internal representation of ADS-PE 71. Note that while the element is called an absolute difference summing unit, metric M may be a representation of a function other than absolute difference. Data line 79 is necessary to maintain pipeline data positioning within the array of processing elements.

Memory 55 is configured with eight banks, where each bank contains 4 slices of 32 addresses, and each address contains 8 bits of data. As shown, each bank is electrically connected to PE array 52 through a separate 8 bit bus connected to a predetermined ADS-PE 71 such that an 8×8 bit row of reference block data can be mapped across the first row of ADS-PE's 71.

This architecture constitutes the preferred embodiment of the present invention; consequently it is important to further discuss the capabilities and limitations of the architecture.

Block difference computations performed on motion estimator 50 fundamentally operate on 8×8 blocks. That is, searches are conducted by processing a series of block differences, where PE array 52 is summing the actual calculation of metrics over the block, and where each block difference is between an 8×8 reference block and typically a succession of 8×8 regions within the search area. The architecture of memory 55 prescribes that the search area be conceptually divided into vertical strips, where the width of a strip is no more than 8 pixels (i.e., the width of PE array 52), and that the search be conducted as a full search (already described). This last requirement is really one of convenience, and may be dropped by making certain modifications to Control Subsystem 53; however, as we will see, limiting ourselves to conducting full searches allows algorithmic and Control Subsystem simplicity while retaining algorithmic flexibility and computational efficiency.

Figure 11:
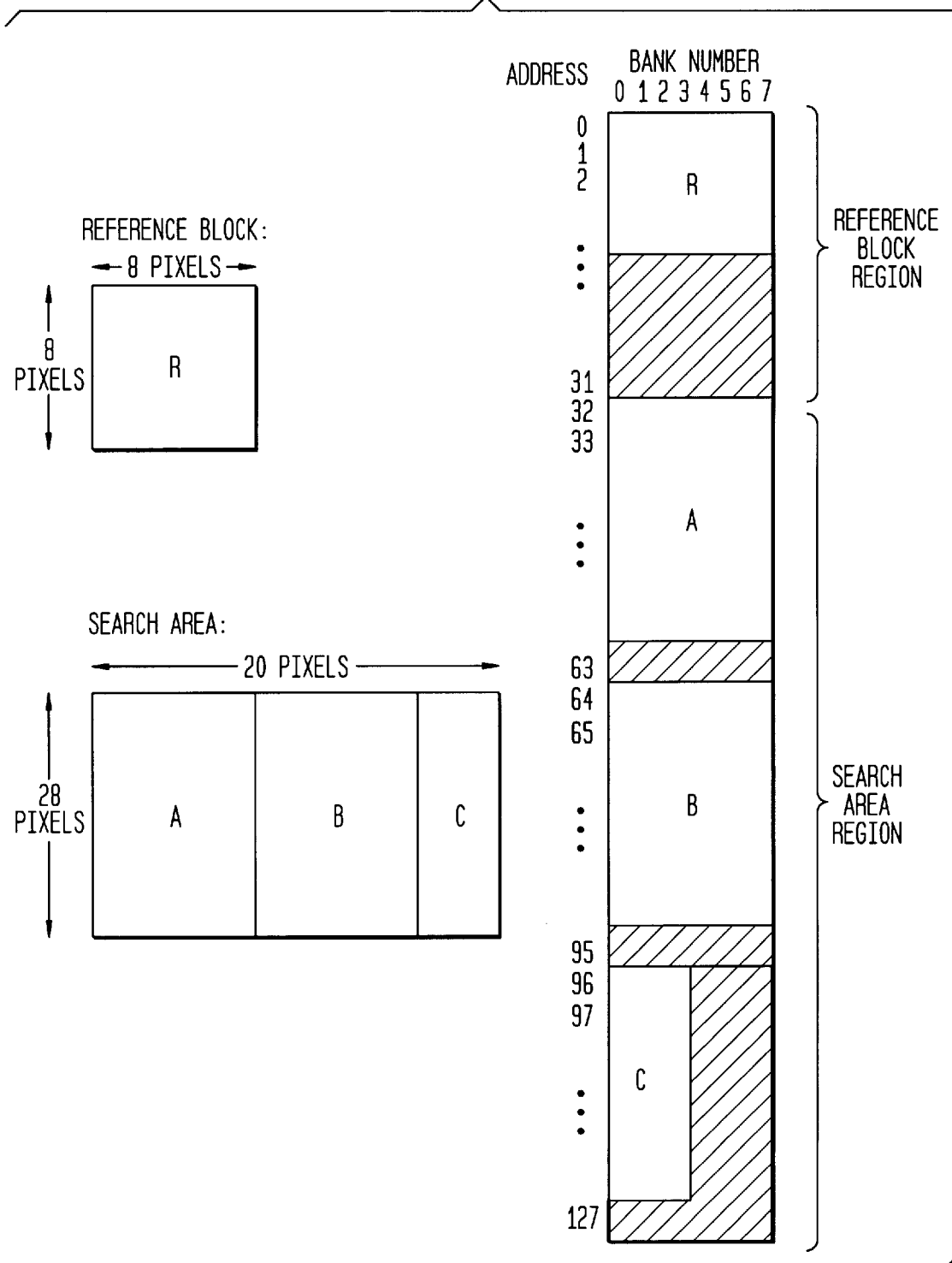
FIG. 11 shows a block diagram of one embodiment of the memory and PE array configuration and the address space mapping.

One possible arrangement of strips in memory 55 is shown in FIG. 11. The architecture of memory 55 is important in that, while it prescribes a method for placement of data (strips) within it, it defines no fundamental limit to the dimensions of the search area except the physical size of memory 55. On the other hand, the architecture of PE array 52, with a configuration of 8×8 elements (ADS-PE 71), constrains this embodiment to operate on 8×8 reference blocks only.

It is a strength of this embodiment, however, that the PE array, which has a fixed 8×8 configuration of ADS-PE processing elements, can be programmed to operate on sections of reference blocks sized other than 8×8 blocks. In effect the array will produce partial block differences which may be combined in Control Subsystem 53 or used as representative of full block differences. Thus, the architecture provides the flexibility to compute block differences with reference blocks sized other than 8×8.

An important example of a reference block sized other than 8×8 is the 16×16 reference block. Two important examples of using PE array 52 to generate block differences for 16×16 reference blocks follow.

Figure 9:
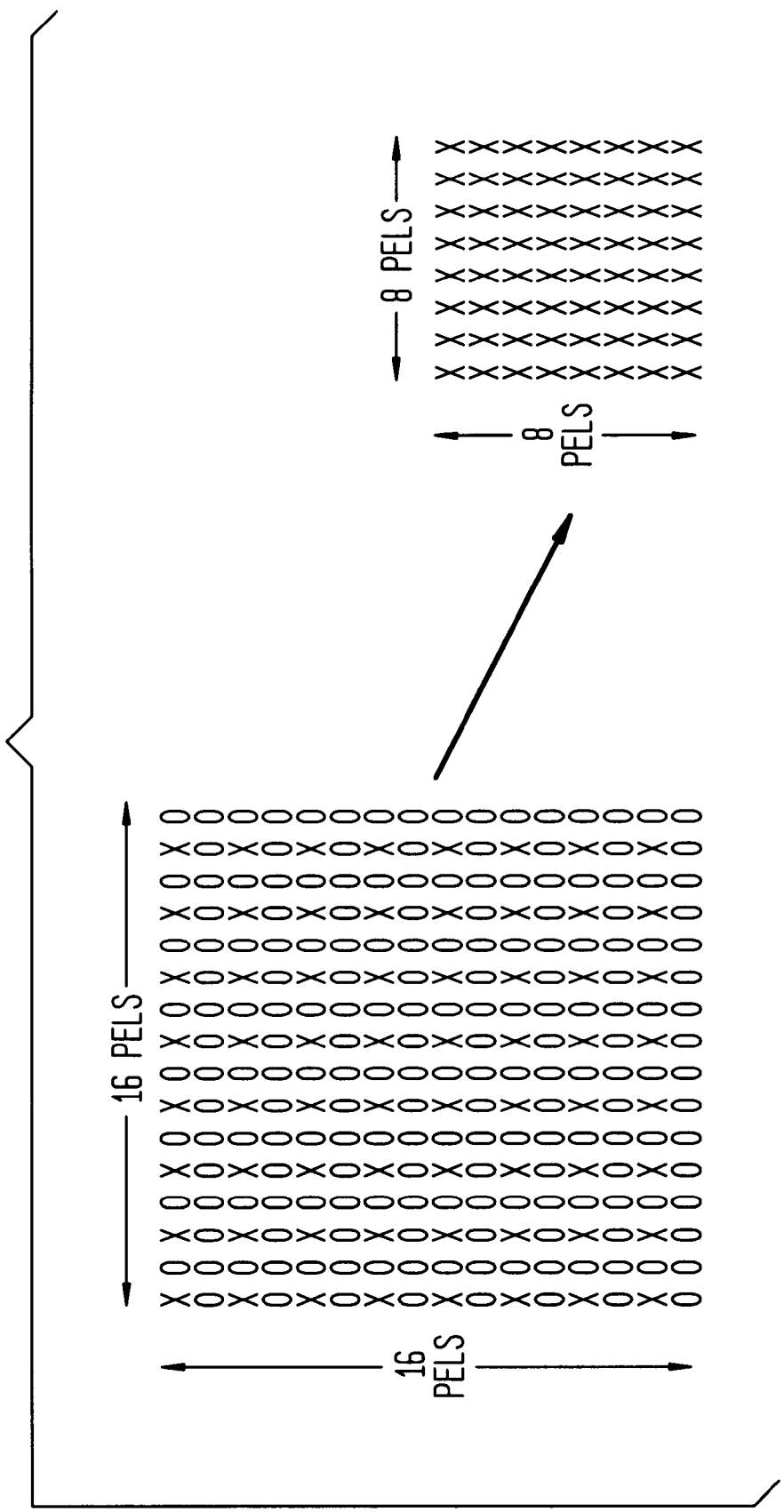
FIG. 9 shows a pictorial view of a 2:1 reduction of a 16×16 macroblock of data to an 8×8 submacroblock.

A 16×16 reference block may be subsampled, along with a J×K search area, to produce an 8×8 subsampled reference block and a J/2×K/2 search area. A pictorial view of this procedure is shown in FIG. 9. Reduction is naturally a task carried out as an algorithmic step outside of motion estimator 50. The resulting block differences and displacements (scaled back to no-subsampled domain) are indicative of those obtained by conducting a J×K search with a 16×16 reference block, and thus are representative of full block differences.

A second example is a 16×16 reference macroblock being sectioned into four 8×8 sub-blocks. A search on one of these sub-blocks will produce partial block differences which must be stored and summed for each sub-block to produce full block differences. Here, logic and storage (which increases in size geometrically with search area) must be added to Control Subsystem 53.

These are two examples of how to map a search using a 16×16 reference block onto an 8×8 array. It is important to note, however, that the actual dimensions of the PE array are flexible, and that larger or smaller PE arrays will allow different reference block mappings at the expense of algorithm or Control Subsystem complexity.

From these examples, it can be seen that the motion estimator architecture of the present invention, including the memory and array, is especially suited to implementing a 2-step algorithm. The algorithm including the steps wherein a 16×16 reference block from the present frame and a J×K search area from the target frame are subsampled to create an 8×8 subsampled reference block and a J/2×K/2 subsampled search area. In operation, the full search is conducted in the subsampled domain to produce one or more block difference/block displacement pairs called survivors. A second group of searches is then conducted in non-subsampled domain. In the non-subsampled domain, each search is conducted around the region of the original J×K search area wherefrom the survivors were obtained. This second group of searches necessitates a 16×16 reference block which is sectioned so that each search is actually performed in 4 stages.

Figure 1:
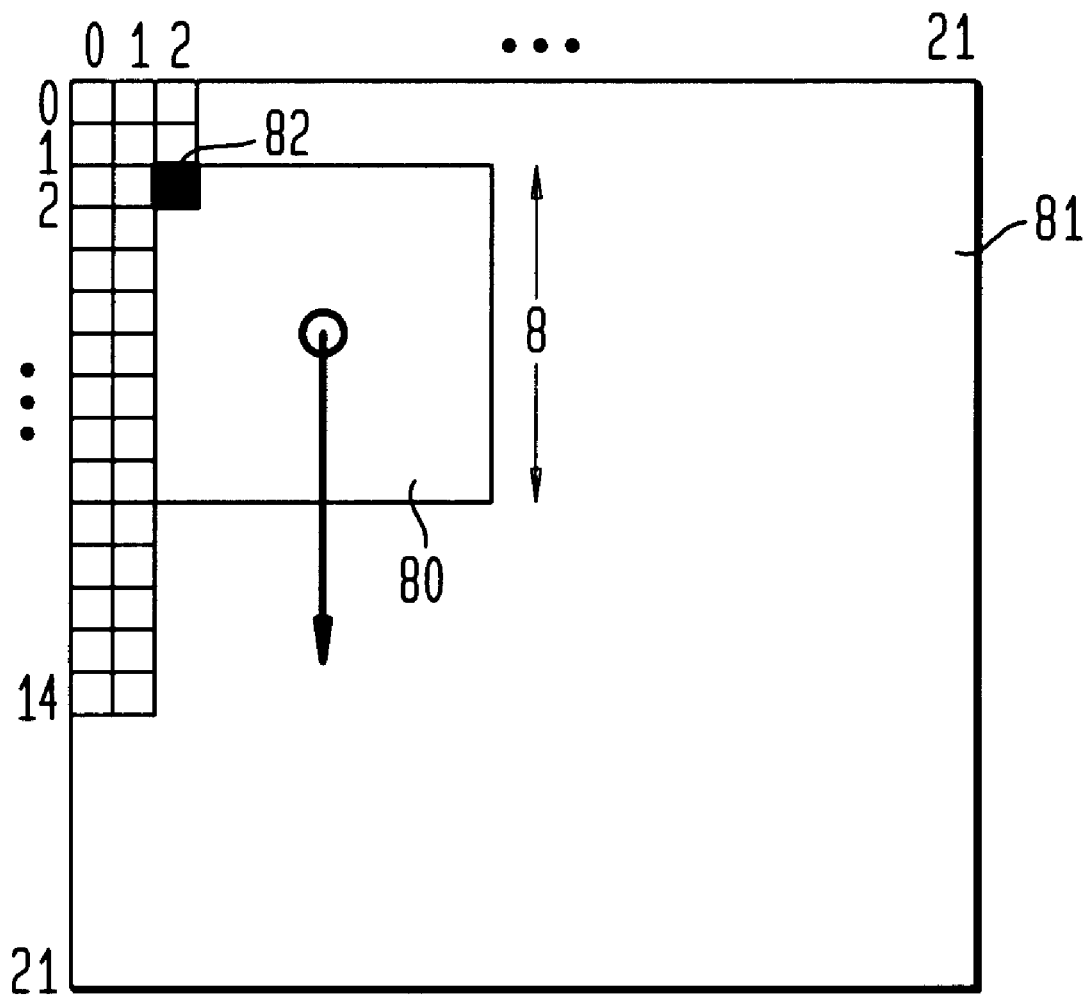
FIG. 1 is a pictorial view of an 8×8 reference block searching through a 21×21 target or search area.
Figure 2:
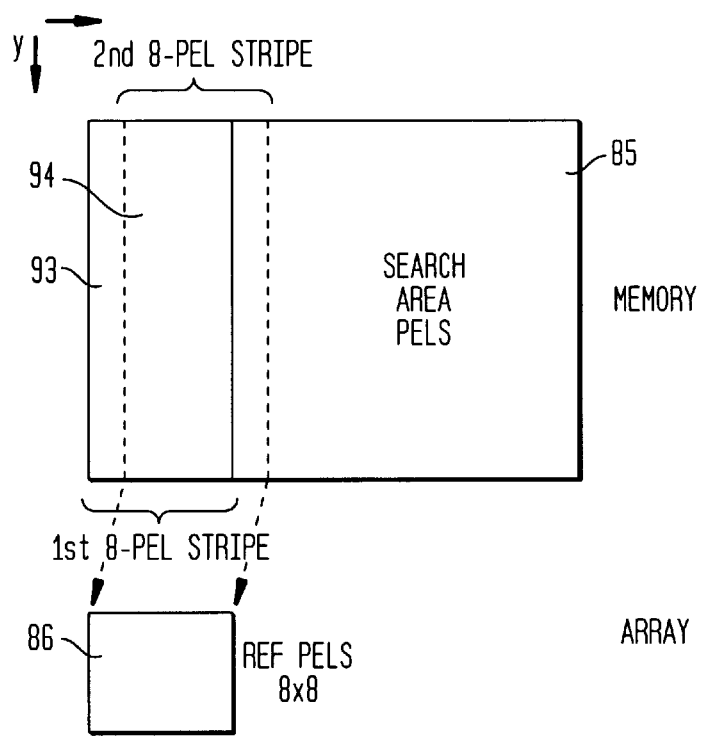
FIG. 2 is a pictorial view of the general architectural scheme showing how the prior art memory and array are used to compute block differences for motion estimators and video encoding subsystems.
Figure 3:
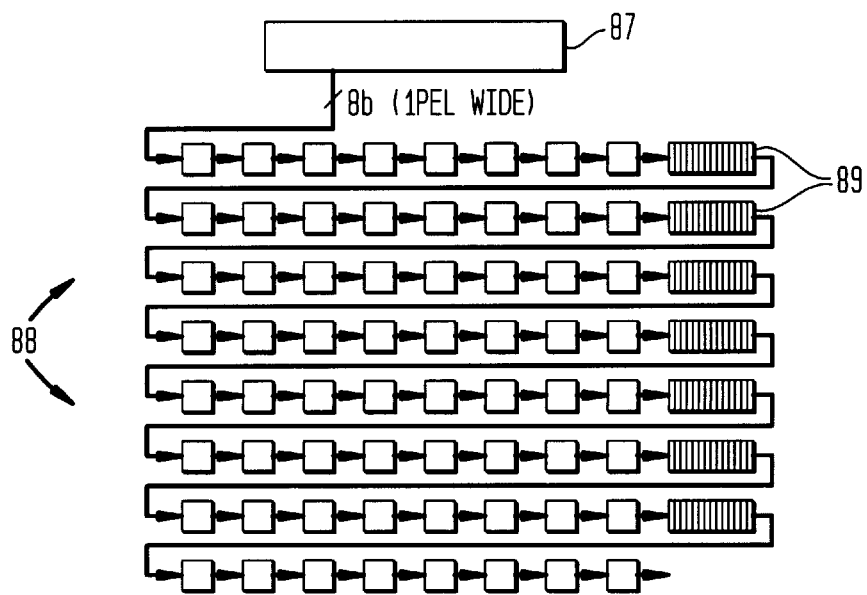
FIG. 3 is a pictorial view of a one dimensional serial array used to compute the block differences in the prior art.

More specifically, in the first step of the 2-step algorithm a full search is conducted in subsampled domain. In the second step, one or more searches are conducted in non-subsampled domain. An example of an 8×8 full search was described earlier and shown in FIG. 1. As shown, 8×8 reference block 80, which represents either a subsampled or sectional 16×16 reference block of the present frame, is searched through search area 81 of the target frame. Note, in this example, pixel 82 denotes the address of that 8×8 block in the search area that is being searched.

The second step comprises a +/−1 search a round each survivor found in the subsampled search. From this step, a set of block differences are calculated for each location of each search. The address of the block having the lowest block difference in the second step is saved as the ultimate best match. This best match is the best estimate of the location of the 16×16 macroblock of the present frame in the search area of the target frame. From this information, the host processor may be able to compress the video data sent to the decoder.

The size of the search area and the number of lowest block differences saved during the full search in the subsampled domain and their respective addresses are flexible. In one embodiment, up to three blocks and their respective locations are stored during the subsampled search as best estimates. In a typical application, this algorithm may be repeated for each 16×16 macroblock of each frame of video.

Figure 4:
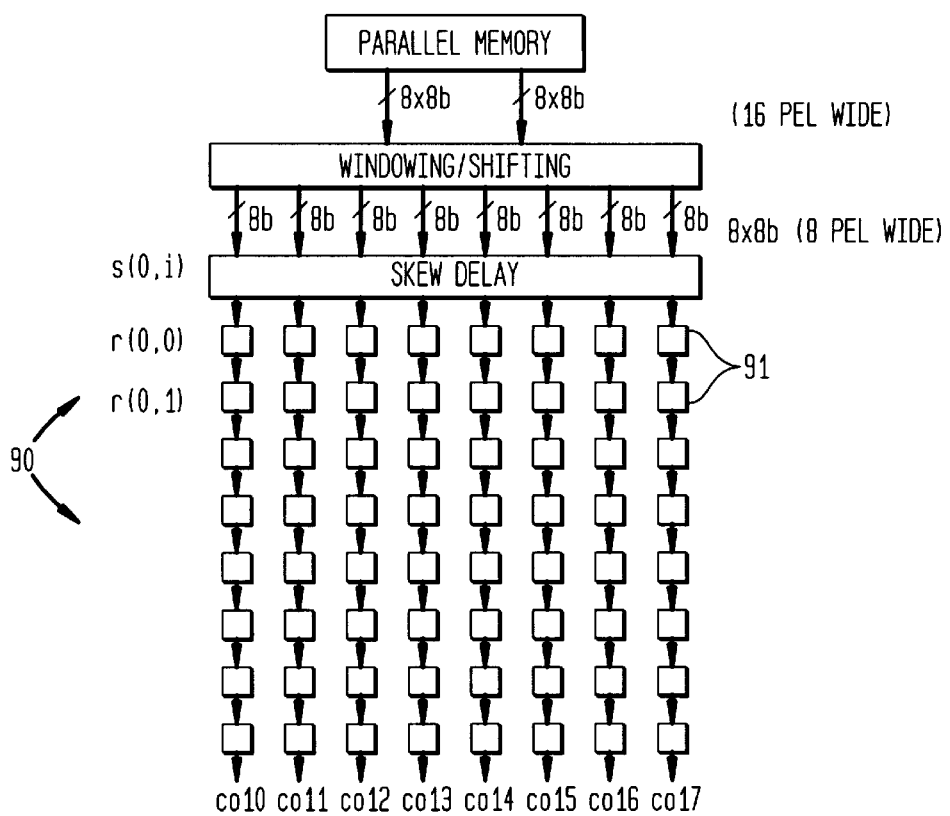
FIG. 4 is a pictorial view of a two dimensional parallel array used to compute the block differences in the prior art.
Figure 5:
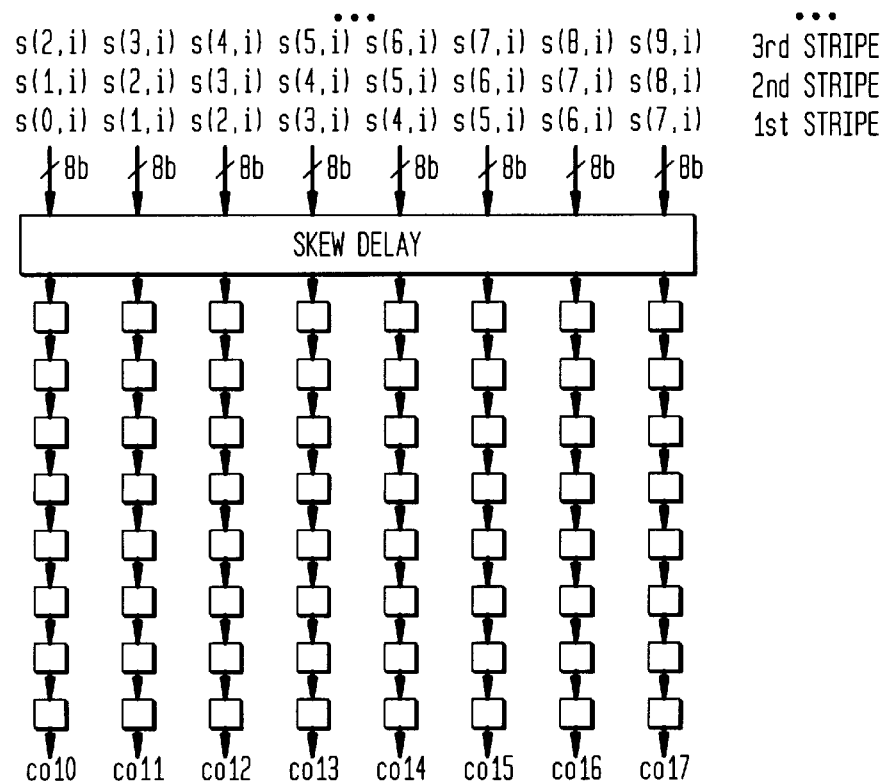
FIG. 5 is a pictorial view of the movement of pixel data in computing block differences in the prior art architecture shown in FIG. 4.
Figure 13:
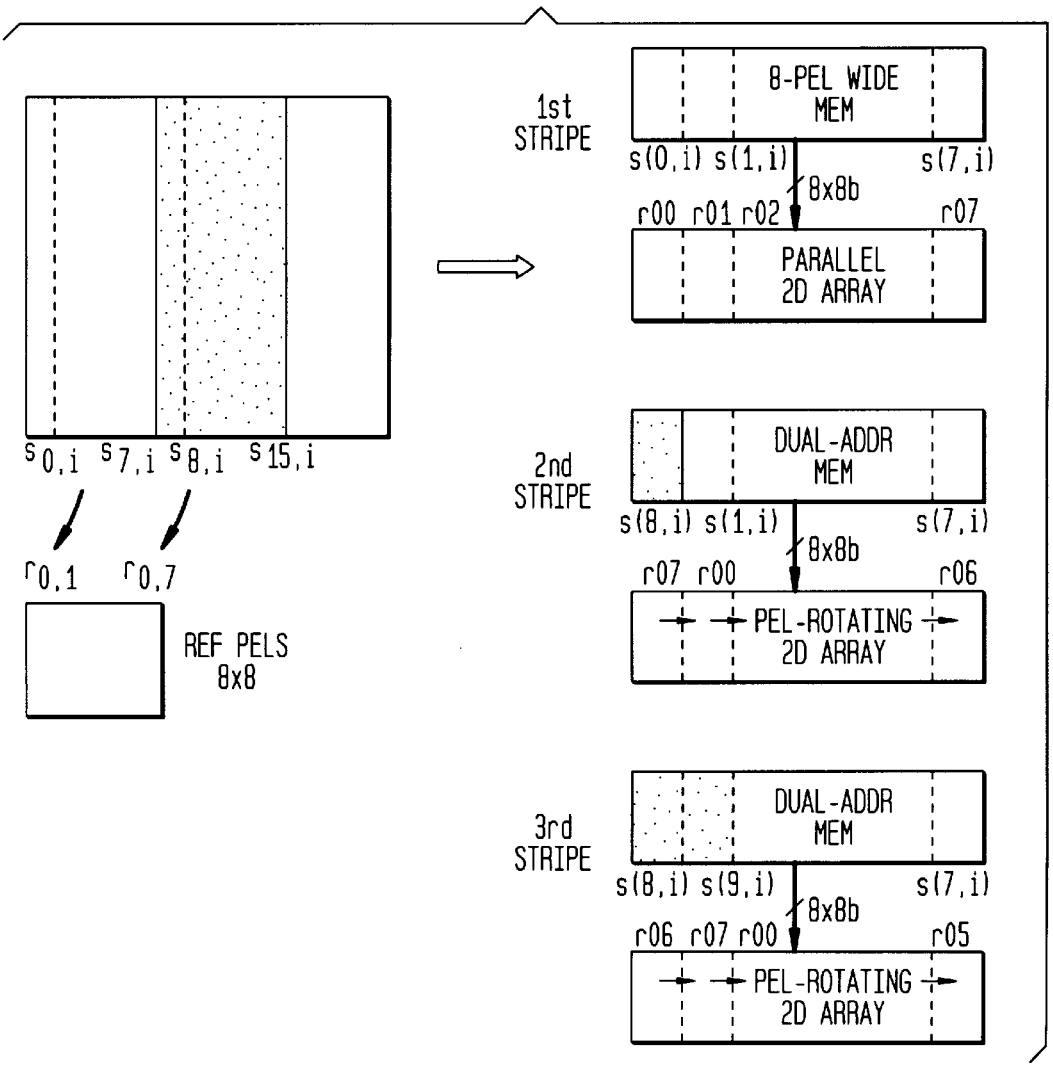
FIG. 13 shows a block diagram view of the data alignment scheme of the present invention as processed in the embodiment shown in FIG. 10.

The joint design of the present inventive architecture and method of computing block differences provides a video encoding subsystem or motion estimator that minimizes the complexity of computing motion vectors without sacrificing video quality. In general, the new design and method provide a novel method of aligning the data in a parallel array for computing the block differences. More specifically, rather than shifting the pel stripes to match the two dimensional array as shown in FIG. 4 and described above, the pel stripes and left in place and only the oldest pels are replaced with the new pels. A block diagram of this data movement and alignment in the array is shown in FIG. 13.

As shown, when the second stripe is computed, the previous S(0,i) is replaced with S(8,i). This, in effect, causes a misalignment with the reference pels stored in the two dimensional array. To compensate for this misalignment, the stored reference pels are rotated in the two dimensional array by one pel to the right whenever the array starts computing block differences for a new stripe. This brings the pels back to proper alignment without stopping the computation. As a result, the processing power required to make the block difference computation is minimized without sacrificing video quality.

What is claimed is:

1. A method of computing block differences between an M×N reference block and a search area block, the search area block having pixel data formatted in rows numbered 1 through P and columns numbered 1 through Q, wherein the rows and columns of the search area block are grouped into overlapping data stripes, each overlapping stripe having P rows and up to N columns, such that successive overlapping stripes are offset by one column in the search area block, the method comprising the steps of:

a. loading a memory having a width of at least N with the search area block, said memory storing the search area block in non-overlapping sub-blocks having a width up to N;

b. loading a processing element array with the M×N reference block;

c. applying a first overlapping stripe of search area data from said memory to said processing element array, said processing element array operable to calculate block differences therefor;

d. rotating said M×N reference block in said processing element array and applying a next overlapping stripe of search area data from said memory to said processing element array to calculate block differences therefor, applying said next stripe as a single column substitution wherein the offset column of the next stripe substitutes for the first column of the previous stripe applied thereto; and e. repeating step d until all the overlapping stripes of the search area block are applied to said processing element array and block differences are calculated therefor.

2. The method of estimating motion as recited in claim 1 wherein steps a through e are repeated for each M×N reference block of a reference frame.

3. The method of estimating motion as recited in claim 1 wherein said applying of said first data stripe in step c is performed one row at a time such that a first block difference is calculated after N rows have been applied thereto and an additional block difference is calculated for each row applied thereafter up to P rows.

4. The method of estimating motion as recited in claim 1 wherein said rotating of said reference block in step d is a right shift rotation with wrap around such that each column of reference pixel data shifts one column to the right and the last column wraps around to the first column.

5. A method of computing block differences between an M×N reference block and a search area block, the search area block having pixel data formatted in rows numbered 1 through P and columns numbered 1 through Q, wherein the rows and columns of the search area block are grouped into overlapping data stripes, each overlapping stripe having P rows and up to N columns, such that successive overlapping stripes are offset by one column in the search area block, the method comprising the steps of:

a. loading a memory having a width of at least N with the search area block, said memory storing the search area block in non-overlapping sub-blocks having a width up to N;

b. loading a processing element array with the M×N reference block;

c. applying a first overlapping stripe of search area data from said memory to said processing element array one row at a time such that a first block difference is calculated after N rows have been applied thereto and an additional block difference is calculated for each row applied thereafter up to P rows, said processing element array operable to calculate block differences therefor;

d. rotating said M×N reference block in said processing element array, as a right shift rotation with wrap around such that each column of reference pixel data shifts one column to the right and the last column wraps around to the first, and applying a next overlapping stripe of search area data from said memory to said processing element array to calculate block differences therefor, applying said next stripe as a single column substitution, wherein the offset column of the next stripe substitutes for the first column of the previous stripe applied thereto;

e. repeating step d until all the overlapping stripes of the search area block are applied to said processing element array and block differences are calculated therefor; and f. repeating steps a through e for each M×N reference block of a reference frame.

6. A programmable motion estimator having a dual-addressing memory and a block rotating array to make block difference calculations, the calculations comprising the steps of:

a. loading the dual -addressing memory with a search area block of data, said memory having a width of at least N for storing said search area block in non-overlapping sub-blocks having a width up to N;

b. loading the block rotating array with an M×N reference block of pixel data;

c. applying a first overlapping stripe of search area data from the memory to said processing element array, said processing element array operable to calculate block differences therefor, said search area having blocks of pixel data formatted in rows numbered 1 through P and columns numbered 1 through Q, wherein the rows and columns are grouped into overlapping data stripes, each overlapping stripe having P rows and up to N columns of pixel data such that successive stripes are offset by one column in the search area;

d. rotating said M×N reference block in the array and applying a next overlapping stripe of search area data from the memory to said processing element array to calculate block differences therefor, applying said next stripe as a single column substitution, wherein the offset column of the next stripe substitutes for the first column of the previous stripe applied thereto; and e. repeating step d until all the overlapping stripes of data of the search area are applied to said processing element array, and block differences are calculated therefor.

7. The motion estimator of claim 6 wherein steps a through e are repeated for each M×N reference block of a reference frame.

8. The motion estimator of claim 6 wherein said applying of said first data stripe in step c is performed one row at a time such that a first block difference is calculated after N rows have been applied therethrough and an additional block difference is calculated for each row applied thereafter up to P rows.

9. The motion estimator of claim 6 wherein said rotating of said reference block in step d is a right shift rotation with wrap around such that each column of reference pixel data shifts one column to the right and the last column wraps around to the first column.

10. A programmable motion estimator having a dual-addressing memory and a block rotating array to make block difference calculations, the calculations comprising the steps of:

a. loading the dual -addressing memory with a search area block of data, said memory having a width of at least N for storing said search area block in non-overlapping sub-blocks having a width up to N;

b. loading the block rotating array with an M×N reference block of pixel data;

c. applying a first overlapping stripe of search area data from the memory to said processing element array, said processing element array operable on one row at a time such that a first block difference is calculated after N rows have been applied therethrough and an additional block difference is calculated for each row applied thereafter up to P rows said search area having blocks of pixel data formatted in rows numbered 1 through P and columns numbered 1 through Q, wherein the rows and columns are grouped into overlapping data stripes, each overlapping stripe having P rows and up to N columns of pixel data such that successive stripes are offset by one column in the search area;

d. rotating said M×N reference block in the array, as a right shift rotation with wrap around such that each column of reference pixel data shifts one column to the right and the last column wraps around to the first, and applying a next overlapping stripe of search area data from the memory to said processing element array to calculate block differences therefor, applying said next overlapping stripe as a single column substitution, wherein the offset column of the next stripe substitutes for the first column of the previous stripe applied thereto;

e. repeating step d until all the overlapping stripes of data of the search area are applied to said processing element array, and block differences are calculated therefor; and f. repeating steps a through e for each M×N reference block of a reference frame.

11. A programmable motion estimator having an architecture that enables a host processor to efficiently calculate motion vectors on successive frames of video, the video frames divided into blocks of pixel data, comprising:

a block difference array to perform block difference calculations on the blocks of pixel data of successive frames of the video;

a memory subsystem to store the pixel data of the video frames and to feed the data to said block difference array, said memory subsystem electrically connected to said array; and a control subsystem electrically connected to said array and said memory subsystem to sequence said memory and to perform post processing on said block difference calculations from said array;

said block difference calculations comprising the steps of:

a. loading said memory with a search area block of data from a target frame of video, said memory storing said search area block in non-overlapping sub-blocks having a width up to N;

b. loading said block difference array with an M×N block of pixel data from a reference frame of video;

c. applying a first stripe of search area data to said processing element array, said processing element array operable to calculate block differences therefor, said search area having blocks of pixel data formatted in rows numbered 1 through P and columns numbered 1 through Q, wherein the rows and columns are grouped into overlapping data stripes, each overlapping stripe having P rows and up to N columns of pixel data, such that successive overlapping stripes are offset by one column in the search area;

d. rotating said M×N reference block in said block difference array and applying a next overlapping stripe of search area data to said processing element array to calculate block differences therefor; applying said next stripe as a single column substitution, wherein the offset column of the next stripe substitutes for the first column of the previous stripe in the search area; and e. repeating step d until all the overlapping stripes of data of the search area are applied to said processing element array and block differences are calculated therefor.

12. The method of estimating motion as recited in claim 11 wherein steps a through e are repeated for each M×N reference block of a reference frame.

13. The method of estimating motion as recited in claim 11 wherein said applying of said first data stripe in step c is performed one row at a time such that a first block difference is calculated after N rows have been applied thereto and an additional block difference is calculated for each row applied thereafter up to P rows.

14. The method of estimating motion as recited in claim 11 wherein said rotating of said reference block in step d is a right shift rotation with wrap around such that each column of reference pixel data shifts one column to the right and the last column wraps around to the first column.

15. A programmable motion estimator having an architecture that enables a host processor to efficiently calculate motion vectors on successive frames of video, the video frames divided into blocks of pixel data, comprising:
   a block difference array to perform block difference calculations on the blocks of pixel data of successive frames of the video;
   a memory subsystem to store the pixel data of the video frames and to feed the data to said block difference array, said memory subsystem electrically connected to said array; and
   a control subsystem electrically connected to said array and said memory subsystem to sequence said memory and to perform post processing on said block difference calculations from said array;
   said block difference calculations comprising the steps of:
   a. loading said memory with a search area block of data from a target frame of video, said memory storing said search area block in non-overlapping sub-blocks having a width up to N;
   b. loading said block difference array with an M×N block of pixel data from a reference frame of video;
   c. applying a first stripe of search area data to said processing element array, said processing element array operable on one row at a time such that a first block difference is calculated after N rows have been applied thereto and an additional block difference is calculated for each row applied thereafter up to P rows; said search area having blocks of pixel data formatted in rows numbered 1 through P and columns numbered 1 through Q, wherein the rows and columns are grouped into overlapping data stripes, each overlapping stripe having P rows and up to N columns of pixel data such that successive overlapping stripes are offset by one column in the search area;
   d. rotating said M×N reference block in said block difference array as a right shift rotation with wrap around such that each column of reference pixel data shifts one column to the right and the last column wraps around to the first, and applying a next overlapping stripe of search area data to said processing element array to calculate block differences therefor, applying said next stripe as a single column substitution, wherein the offset column of the next stripe substitutes for the first column of the previous stripe in the search area;
   e. repeating step d until all the overlapping stripes of data of the search area are applied to said processing element array and block differences are calculated therefor; and f. repeating steps a through e for each M×N reference block of a reference frame.

16. The programmable motion estimator of claim 11 wherein said memory subsystem is an A×B×M memory that implements a predetermined dual addressing scheme for said steps of calculating said block differences in said array.

17. The programmable motion estimator of claim 11 further including an algorithm control, said algorithm control comprising a host processor and a host I/O interface, said host I/O interface providing a communication medium for said host processor to communicate with said motion estimator.

18. The programmable motion estimator of claim 11 further comprising a data control, said data control including an address generator, a data formatter and a memory I/O interface, said memory I/O interface providing a communication interface for a host random access memory to communicate with the motion estimator.

19. A method of computing block differences between an M×N reference block and a search area block, the search area block having pixel data formatted in rows numbered 1 through P and columns numbered 1 through Q, wherein the rows and columns of the search area block are grouped into overlapping data stripes, each overlapping stripe having P rows and up to N columns, such that successive overlapping stripes are offset by one column in the search area block, the method comprising the steps of:
   loading a memory having a width of at least N with the search area block, said memory storing the search area block in non-overlapping sub-blocks having a width up to N;
   loading a processing element array with the M×N reference block;
   applying a first overlapping stripe of search area data from said memory to said processing element array, said processing element array operable to calculate block differences therefor;
   rotating said M×N reference block in said processing element array while simultaneously applying a next overlapping stripe of search area data from said memory to said processing element array to calculate block differences therefor, applying said next stripe as a single column substitution wherein the offset column of the next stripe substitutes for the first column of the previous stripe applied thereto, and
   repeating said rotating step until all the overlapping stripes of the search area block are applied to said processing element array and block differences are calculated therefor.

20. A programmable motion estimator having a dual-addressing memory and a block rotating array to make block difference calculations, the calculations comprising the steps of:
   loading the dual-addressing memory with a search area block of data, said memory having a width of at least N for storing said search area block in non-overlapping sub-blocks having a width up to N;
   loading the block rotating array with an M×N reference block of pixel data;
   applying a first overlapping stripe of search area data from the memory to said processing element array, said processing element array operable to calculate block differences therefor, said search area having blocks of pixel data formatted in rows numbered 1 through P and columns numbered 1 through Q, wherein the rows and columns are grouped into overlapping data stripes, each overlapping stripe having P rows and up to N columns of pixel data, such that successive stripes are offset by one column in the search area;

rotating said M×N reference block in the array while concurrently applying a next overlapping stripe of search area data from the memory to said processing element array to calculate block differences therefor, applying said next stripe as a single column substitution wherein the offset column of the next stripe substitutes for the first column of the previous stripe applied thereto; and repeating said rotating step until all the overlapping stripes of data of the search area are applied to said processing element array, and block differences are calculated therefor.

21. A programmable motion estimator having an architecture that enables a host processor to efficiently calculate motion vectors on successive frames of video, the video frames divided into blocks of pixel data, comprising:

a block difference array to perform block difference calculations on the blocks of pixel data of successive frames of the video;

a memory subsystem to store the pixel data of the video frames and to feed the data to said block difference array, said memory subsystem electrically connected to said array; and a control subsystem electrically connected to said array and said memory subsystem to sequence said memory and to perform post processing on said block difference calculations from said array;

said block difference calculations comprising the steps of:

loading said memory with a search area block of data from a target frame of video, said memory storing said search area block in non-overlapping sub-blocks having a width up to N;

loading said block difference array with an M×N block of pixel data from a reference frame of video;

applying a first stripe of search area data to said processing element array, said processing element array operable to calculate block differences therefor, said search area having blocks of pixel data formatted in rows numbered 1 through P and columns numbered 1 through Q, wherein the rows and columns are grouped into overlapping data stripes, each overlapping stripe having P rows and up to N columns of pixel data, such that successive overlapping stripes are offset by one column in the search area;

rotating said M×N reference block in said block difference array while concurrently applying a next overlapping stripe of search area data to said processing element array to calculate block differences therefor, applying said next stripe as a single column substitution wherein the offset column of the next stripe substitutes for the first column of the previous stripe applied thereto; and repeating said rotating step until all the overlapping stripes of data of the search area are applied to said processing element array and block differences are calculated therefor.

* * * * *